(12) United States Patent
Krueger

(10) Patent No.: US 7,966,904 B2
(45) Date of Patent: Jun. 28, 2011

(54) LOW AXIAL PLAY DRIVE SYSTEM

(75) Inventor: Dale R. Krueger, Woodstock, IL (US)

(73) Assignee: Questek Manufacturing Corporation, Elgin, IL (US)

( * ) Notice: Subject to any disclaimer, the term of this patent is extended or adjusted under 35 U.S.C. 154(b) by 779 days.

(21) Appl. No.: 11/381,756

(22) Filed: May 5, 2006

(65) Prior Publication Data

US 2007/0295134 A1    Dec. 27, 2007

(51) Int. Cl.
*B60R 1/06* (2006.01)
(52) U.S. Cl. .............. 74/425; 74/409; 74/440; 359/877; 384/613
(58) Field of Classification Search .............. 74/425, 74/409, 440; 359/873, 877; 384/613
See application file for complete search history.

(56) References Cited

U.S. PATENT DOCUMENTS

| | | | |
|---|---|---|---|
| 3,006,211 A * | 10/1961 | Mueller | .......................... 74/440 |
| 3,830,553 A * | 8/1974 | Schurger et al. | .............. 384/613 |
| 4,116,538 A | 9/1978 | Oskam | |
| 4,261,218 A * | 4/1981 | Eagan, Sr. | ....................... 74/409 |
| 4,281,899 A | 8/1981 | Oskam | |
| 4,787,726 A | 11/1988 | Hendricks | |
| 4,895,337 A | 1/1990 | Oskam et al. | |
| 4,991,950 A | 2/1991 | Lang et al. | |
| 5,110,196 A | 5/1992 | Lang et al. | |
| 5,823,054 A | 10/1998 | Brouwer | |
| 5,834,662 A * | 11/1998 | Stoll et al. | ........................ 74/425 |
| 5,931,438 A | 8/1999 | Brouwer | |
| 6,022,113 A | 2/2000 | Stolpe et al. | |
| 6,224,220 B1 * | 5/2001 | Duroux et al. | ................ 359/877 |
| 6,283,863 B1 | 9/2001 | Lang et al. | |
| 6,616,288 B2 | 9/2003 | Duroux et al. | |
| 6,679,610 B2 * | 1/2004 | Yamauchi | ..................... 359/841 |
| 6,811,270 B2 | 11/2004 | Yoshida | |
| 6,857,787 B1 * | 2/2005 | Meier et al. | .................... 384/619 |
| 6,923,547 B2 * | 8/2005 | Yoshida et al. | ............... 359/841 |

* cited by examiner

*Primary Examiner* — Richard W Ridley
*Assistant Examiner* — Thomas Diaz
(74) *Attorney, Agent, or Firm* — Cook Alex Ltd.

(57) ABSTRACT

A drive system for rotating an assembly, such as an external vehicle mirror housing, about an axis is provided with a drive housing containing a worm drive assembly coupled to an axis gear mounted about the axis. The worm drive assembly is rotated by an electric motor. The axis gear is stationary with respect to the axis, such that rotation of the worm drive assembly will cause it to travel about the axis gear. Such movement of the worm drive assembly will cause the drive housing and the associated external vehicle mirror housing to rotate about the axis. Thrust transmitted to the worm drive assembly is transmitted to a central portion of the drive housing by a shaft retainer associated with the worm drive assembly. Play between the axis gear and the worm drive assembly is prevented by eliminating separation between adjacent components of the worm drive assembly.

11 Claims, 5 Drawing Sheets

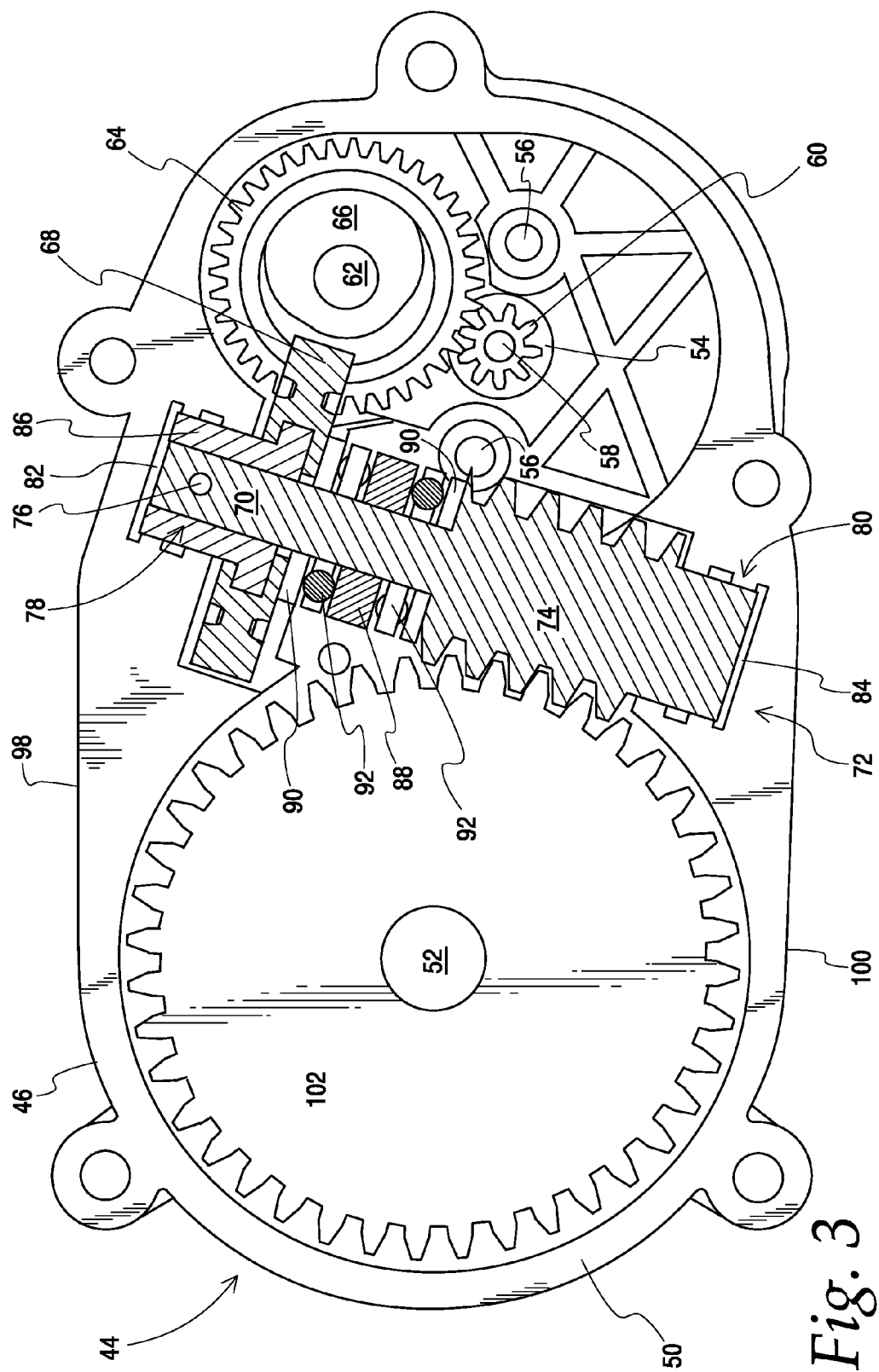

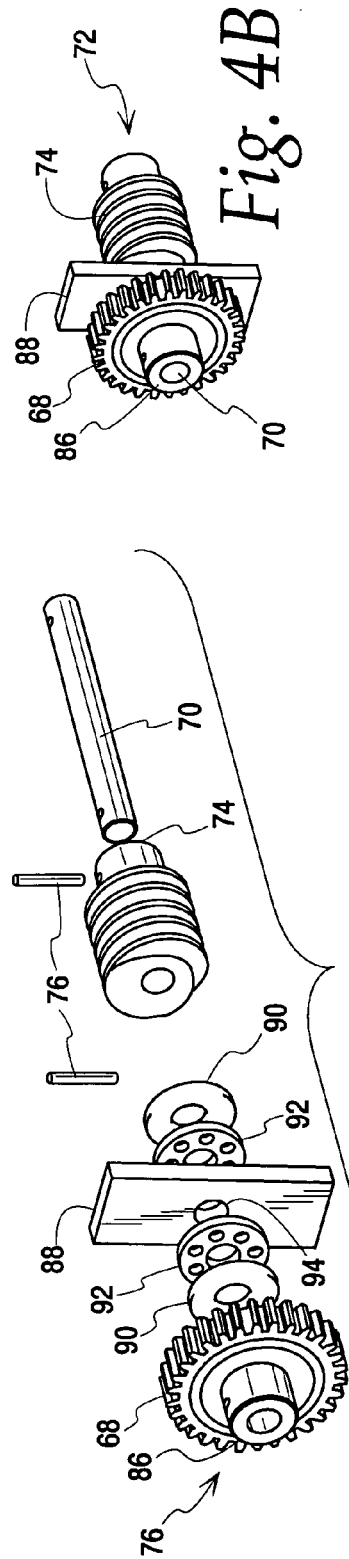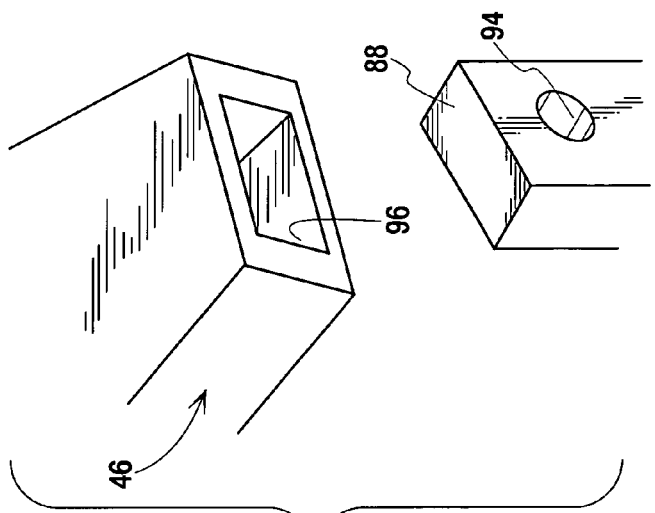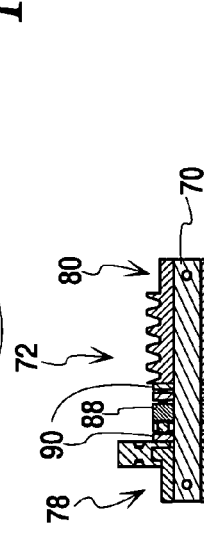

LOW AXIAL PLAY DRIVE SYSTEM

BACKGROUND OF THE INVENTION

This invention generally relates to a drive system for rotating an assembly about an axis. More particularly, this invention relates to drive system suitable for remotely adjusting an external vehicle mirror housing.

Automobiles and many other motor vehicles utilize one or more adjustable rearview mirrors to allow the operator to view conditions to the sides and rear of the vehicle. These rearview mirrors may be mounted within the vehicle cabin or outside, on the frame of the vehicle. Proper orientation of the rearview mirrors is important to safe operation of the vehicle, but it can be difficult to adjust an external mirror, especially during operation of the vehicle. Accordingly, it is known to provide a drive system for remotely adjusting an external mirror from the vehicle cabin. One example of such a drive system is described in U.S. Pat. No. 4,787,726 to Hendricks, the disclosure of which is hereby incorporated herein by reference.

FIG. 1 illustrates a drive system according to one known design. The drive system, generally identified in FIG. 1 as element 10, is contained within a drive housing 12 that is receivable in or adjacent to a mirror housing (not shown). The mirror housing is rotatably associated with a vertical rod 14, which is substantially stationary with respect to the vehicle frame (also not shown). The vertical rod 14 extends through the drive housing 12 and defines an axis about which the drive housing 12 is rotatable. The vertical rod 14 is encircled by an axis gear 16 inside of the drive housing 12. Typically, the axis gear 16 is a worm gear or worm wheel which is normally stationary with respect to the vertical rod 14. Under certain conditions, described below, the axis gear 16 may be forced to rotate about the vertical rod 14 in order to rotate the drive housing 12 and the mirror housing.

The axis gear 16 engages a drive gear 18, which is mounted on a shaft 20 for rotation therewith. The drive gear 18 is typically a worm, but may take a different form depending on the geometry of the axis gear 16. The shaft 20 is supported by bearings 22 adjacent to a front wall 24 and a rear wall 26 of the drive housing 12. A worm gear 28 is also mounted on the shaft 20 for rotation therewith. The worm gear 28 engages a worm 30 mounted on a shaft 32 for rotation therewith. A spur gear 34 is also mounted on the shaft 32 for rotation therewith. The spur gear 34 engages a pinion 36 mounted on a shaft 38, which is rotated by an electric motor 40.

In use, the pinion 36 is rotated by the motor 34, which ultimately rotates the drive gear 18. The torque supplied by the drive gear 18 is not sufficient to rotate the axis gear 16, so the drive gear 18 travels about the axis gear 16. This movement of the drive gear 18 causes the associated drive housing 12 to rotate about the axis defined by the vertical rod 14. Since the mirror housing is fixed to the drive housing 12, it is effectively adjusted by the movement of the drive gear 18.

As mentioned above, the axis gear 16 is normally rotationally connected to the vertical rod 14 via a slip clutch mechanism. Normally gear 16 will not rotate with respect to shaft 14 unless it is acted upon by a sufficient torque. The torque applied by operation of the drive system 10 is normally not sufficient to rotate the axis gear 16 with respect to shaft 14. However, there may be instances where either an external force is sufficient to force rotation or the drive system may force the axis gear 16 to rotate with respect to shaft 14 if the housing is being prevented from rotating about the axis (when the motor is running) by an obstruction or abnormal friction. For example, the torque applied by an operator manually adjusting the mirror housing or by an object striking the mirror housing will cause the axis gear 16, and hence the drive housing 12 and mirror housing, to rotate about the vertical rod 14. The clutch will then slip, preventing damage to the gears and to the motor itself. Of course, this is an optional feature of the drive system 10, but it is useful in preventing damage to the gears. A number of forced rotation systems are known, including one described in Hendricks and another described in U.S. Pat. No. 6,022,113 to Stolpe et al., the disclosure of which is hereby incorporated herein by reference.

It is desirable that there be no uncertainty in the rotational position of housing 12 (and thus the mirror glass) with respect to shaft 14 (and thus the vehicle frame). Such uncertainty or "play" means that the mirror glass does not stay in a fixed position with respect to the vehicle when subjected to outside vibration/excitation forces. Rotational position uncertainty has multiple sources depending on the mechanism, and these are typically additive i.e. total uncertainty equals the sum of the contributing factor uncertainties. Backlash in the mesh of the gears is one contributing factor to this uncertainty.

The present invention doesn't affect backlash, as it would strictly be defined. Backlash is a characteristic of gear tooth mesh wherein only one side of a given tooth can be in contact with the mating gear at a given position or point in time. There is space on the other side of that tooth and therefore the relative positions of the two gears in mesh have some uncertainty. With this uncertainty of relative position, there can be uncontrolled instantaneous rotational acceleration.

Having the final drive (18) be a worm has the advantage that the mechanism is not subject to back drive (i.e. the gears will not be driven when torque is applied on the housing 12 with respect to shaft 14 and axis gear 16) if the lead angle of the worm is low enough. However worms have the characteristic that transmission of torque is accompanied by thrust loads in the direction of the worm's axis.

If the worm is not sufficiently constrained in its axial direction, external forces on the mirror will be able to effect rotation of housing 12 about shaft 14. This can occur even if there is no backlash in the mesh of drive gear 18 to axis gear 16 (i.e. a given tooth on axis gear 16 has contact on both sides with worm 18 a.k.a. double flank contact). This is because the worm 18 will slide along its axis until it contacts the bearings 22 which contact housing 12 at either rear wall 26 or front wall 24, depending on direction.

Therefore it is desirable to have low axial play in the assembly containing worm 18. As shown in FIG. 1 (prior art), the amount of axial play in the 18 worm assembly is determined by the tolerances on the distance between 42-42 the ribs 42, the thickness of bearings 22, and the lengths of the gears 18 & and 28. A tolerance of +/−0.005 on each of these five features produces overall tolerance of 0.050". To accommodate these tolerances and not have interference a nominal clearance of 0.025" would have to be provided, which could then result in 0 to 0.050" clearance depending on the sizes of the five features in the population of parts. At 16-18a mesh distance of 0.83 in gears 16 and 18, 0.050" axial play in worm 18 allows nearly 3.5° in rotation of housing 12 (and hence the mirror glass) when the mirror is subjected to road and vehicle induced vibration/excitation. It is very difficult for the driver to use or view the image from a mirror with such movement. Therefore the tolerances employed in a mechanism of this design must be much tighter, and manufacturing expenses will be higher. Even with tighter tolerances, zero axial play can not be feasibly achieved with this approach. This is a drawback of this approach.

Another possible drawback of known drive systems, especially when the drive gear 18 is a worm gear or a helical gear, is that a great deal of thrust may be transmitted through the drive gear 18 and the shaft 20 to the front and rear walls 24 and 26 of the drive housing 12. Accordingly, the front and rear walls 24 and 26 must be reinforced to prevent deformation. For example, FIG. 1 shows reinforcing ribs 42 used to prevent the front and rear walls 24 and 26 from bowing outwardly under the force transmitted through the shaft 20.

Accordingly, a general object and aspect of the present invention is to provide an improved drive system which overcomes the above-described drawbacks of known systems.

Other aspects, objects and advantages of the present invention, including the various features used in various combinations, will be understood from the following description according to preferred embodiments of the present invention, taken in conjunction with the drawings in which certain specific features are shown.

SUMMARY OF THE INVENTION

In accordance with the present invention, a drive system for rotating an assembly about an axis includes a motor operatively coupled to a shaft, which is rotatable within a drive housing. A drive gear mounted on the shaft for rotation therewith engages an axis gear, which is coaxial with the axis. A shaft retainer is also associated with the shaft, between first and second ends thereof. The shaft retainer is substantially stationary with respect to the drive housing, which improves upon known drive systems by substantially eliminating axial play and channeling thrust away from the front and rear walls of the drive housing.

Drive systems according to the present invention are particularly well-suited for remotely adjusting an external vehicle mirror housing. Of course, it will be appreciated that the drive systems described herein are not limited to particular devices, but may find use in many different applications requiring rotation of an assembly about an axis.

BRIEF DESCRIPTION OF THE DRAWINGS

FIG. 3 is a cross-sectional view of the drive system of FIG. 2, taken along line 3-3 of FIG. 2.

FIG. 4A is an exploded view of a worm drive assembly suitable for use in a drive system according to the present invention.

FIG. 4B is an assembled view of the worm drive assembly of FIG. 4A.

FIG. 5 is a side elevational view of the worm drive assembly of FIG. 4B.

FIG. 6 is a cross-sectional view of the worm drive assembly of FIG. 5, taken along line 6-6 of FIG. 5.

FIG. 7 is a detail view of a tapered recess of the drive housing of FIG. 2.

DESCRIPTION OF THE PREFERRED EMBODIMENTS

Figure 2:
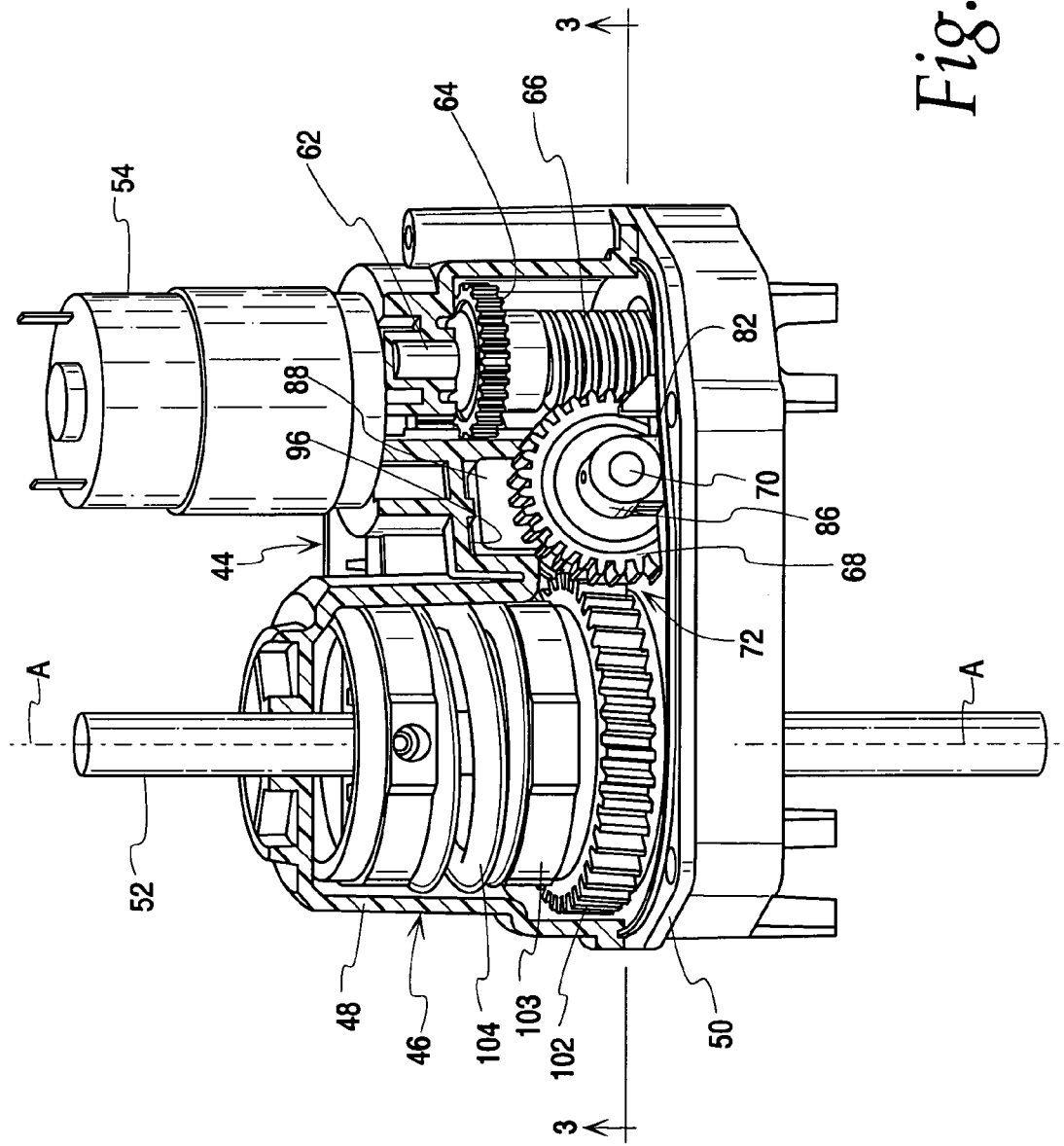
FIG. 2 is a front perspective view of a drive system according to the present invention, with certain portions broken away.

FIG. 2 shows a drive system 44 according to the present invention. The drive system 44 is contained within a substantially enclosed, rigid drive housing 46. The drive housing 46 is preferably comprised of a plurality of connectable plastic components, illustrated in FIG. 2 as an upper enclosure 48 and a lower floor 50. The drive housing 46 is contained within or mounted adjacent to an assembly (not illustrated) to be rotated about an axis A. The drive housing 46 is rigidly fixed to the assembly, such that movement of the drive housing 46 about the axis A will also rotate the associated assembly. Typically, the assembly is an external vehicle mirror housing and the axis A is defined by a vertical rod 52 associated with a vehicle frame (not illustrated). When used in combination with an external vehicle mirror housing, the drive housing 46 is usually mounted therein, in order to conceal its operation and to protect it from the outside environment.

All of the components of the drive system 44 are typically contained entirely within the drive housing 46, except for an electric motor 54 secured to the exterior of the drive housing 46. The motor 54 is rigidly secured to the drive housing 46 by any suitable means, such as the screws 56 of FIG. 3. A motor shaft (not shown) of the motor 54 extends through an opening of the drive housing 46 into the interior thereof. The motor 54 is connected to an electrical power source, not shown, which provides power to the motor 54 in order to rotate the motor shaft. The motor 54 is reversible, such that the motor shaft can be made to rotate either clockwise or counterclockwise. A motor pinion is mounted on the motor shaft for rotation therewith.

A first shaft 62 is mounted for rotation within the drive housing 46. The first shaft 62 may be mounted according to any known method, such as with ball bearings or, more preferably, with journal bearings defined by the drive housing 46. A spur gear 64 and a worm 66 are mounted on the first shaft 62 for rotation therewith. The spur gear 64 engages the motor pinion, which effectively causes the motor 54 to drive and rotate the first shaft 62 and the components mounted thereon.

The worm 66 engages a worm gear 68 to rotate a second shaft 70 of a worm drive assembly 72. The worm drive assembly 72 is illustrated in detail in FIG. 3. In addition to the second shaft 70 and worm gear 68, the worm drive assembly 72 also includes drive gear 74 that is mounted on the second shaft 70 for rotation therewith. The worm gear 68 and/or drive gear 74 may be affixed to the second shaft 70 according to any known method. For example, FIG. 3 shows a worm gear 68 mounted onto the second shaft 70 by a pin 76, while the drive gear 74 is integrally formed as a part of the second shaft 70. FIGS. 4A-6 show a preferred embodiment in which both the worm gear 68 and the drive gear 74 are secured to the second shaft 70 by pins 76. The spur gear 64 and the worm 66 may be similarly secured to the first shaft 62 using pins or the like.

Figure 1:
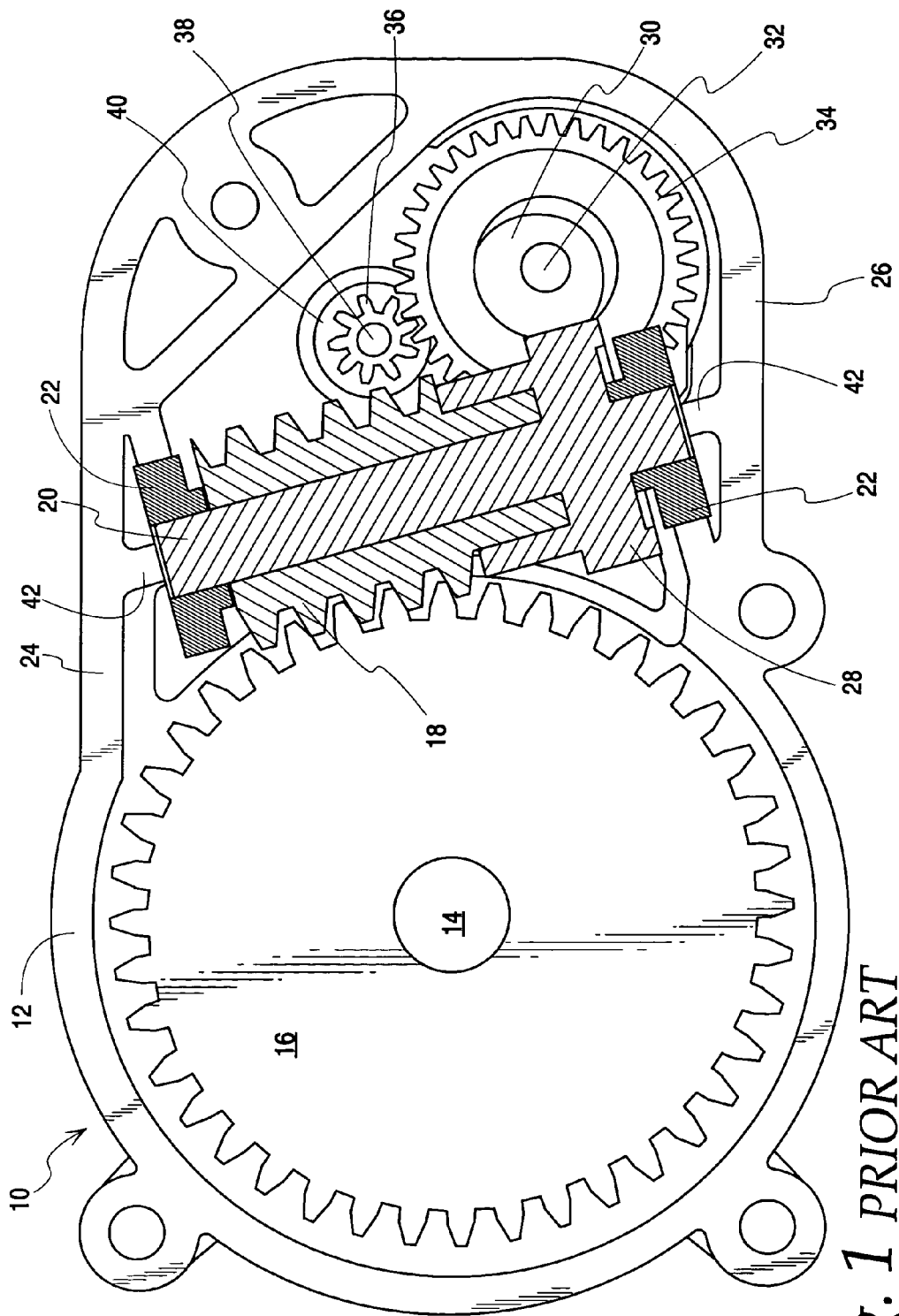
FIG. 1 is a bottom plan view of a prior art drive system.

In contrast to the prior art drive system 10 of FIG. 1, the ends 78 and 80 of the second shaft 70 may be mounted within journal bearings 82 and 84 defined by the drive housing 46. In the embodiment of FIG. 3, the first end 78 includes a hub insert 86 of the worm gear 68 that is received within the first journal bearing 82. Preferably, the hub insert 86 is substantially comprised of a metal material and the worm gear 68 is substantially comprised of a plastic material that is molded onto the hub insert 86. As will be appreciated, plastic gears are cheaper, lighter, and quieter than metal gears, but it is preferred to use a metal hub insert 86 for improved wear and durability. The second journal bearing 84 receives a portion of the drive gear 74 associated with the second end 80 of the second shaft 70.

The worm drive assembly 72 includes a shaft retainer 88 and preferably two thrust washers 90 and two ball thrust bearings 92. As illustrated in FIGS. 3-6, the drive gear 74 preferably takes the form of a worm, so the thrust washers 90 and ball thrust bearings 92 are useful in accommodating the thrust generated by the drive gear 74.

The shaft retainer 88 is preferably a metal plate having an aperture 94 (FIG. 4A) through which the second shaft 70 passes. The aperture 94 is preferably large enough to allow the second shaft 70 to rotate. Radial movement of the shaft 70 is prevented by the bearings 82 and 84. The shaft retainer 88 is stationary with respect to the drive housing 46. As shown in FIG. 7, the shaft retainer 88 is preferably received by the upper enclosure 48 and lower floor 50 of the drive housing 46. The enclosure and floor 48 and 50 may include a tapered recess 96 adapted to receive and retain the shaft retainer 88. Preferably, the width of the tapered recess 96 is substantially the same as the thickness t (FIG. 5) of the shaft retainer 88, in order to prevent axial movement of the shaft retainer 88 along the second shaft 70. The shaft retainer 88 is hardened steel to so that the balls of the ball thrust bearings 92 may ride directly on it, eliminating the need for thrust washers on the shaft retainer side of each ball thrust bearing and saving space. Making the shaft retainer of steel allows the transmittal of the thrust loads to the housing with minimal deflection under load.

Figure 8:
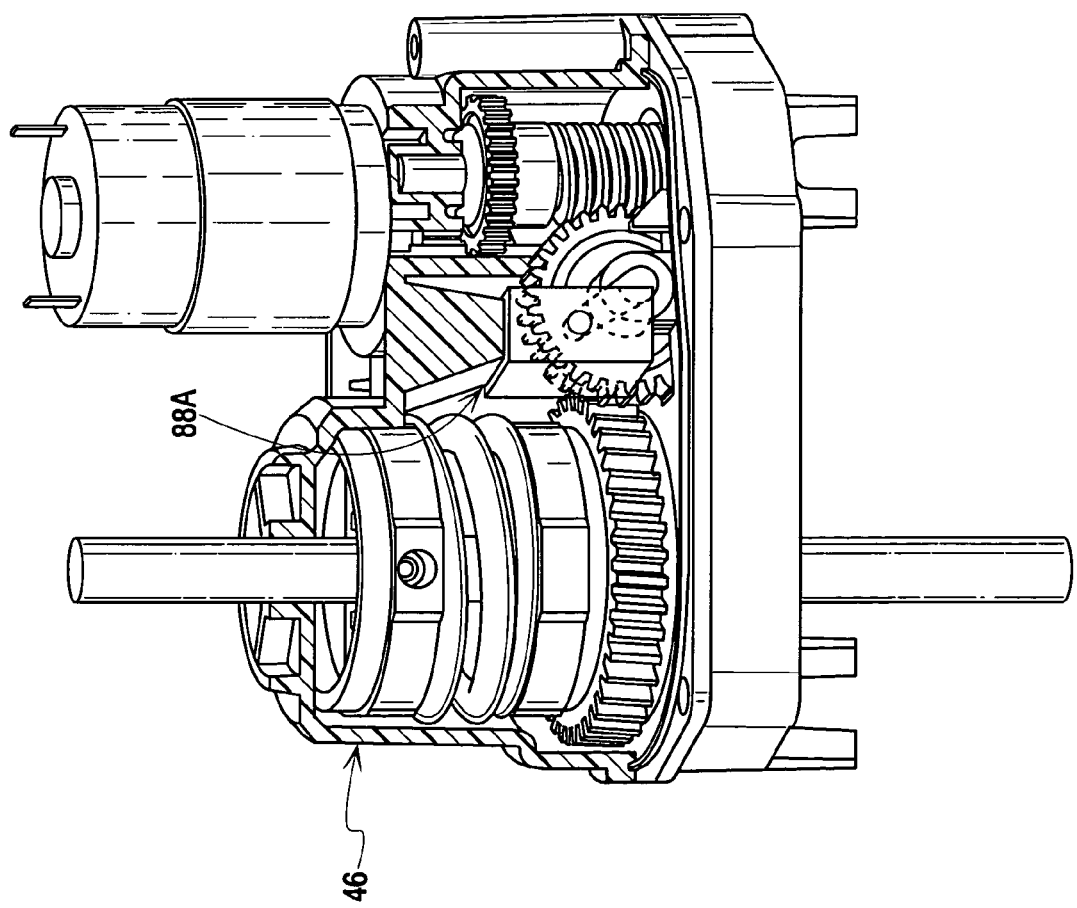
FIG. 8 is a front perspective view of another embodiment of a drive system according to the present invention, with certain portions broken away.

In another embodiment of the present invention, illustrated in FIG. 8, the shaft retainer 88a may be a plastic component integrally formed with the upper and/or lower portion of the drive housing. This may be useful in preventing movement of the shaft retainer with respect to the drive housing, but it is preferred to provide a separate shaft retainer in order to simplify assembly of the drive system.

The thrust that is developed in the drive gear 74 will be transmitted to the shaft retainer 88 via the thrust washers 90 and ball thrust bearings 92. Then, the thrust will be transmitted from the shaft retainer 88 to the drive housing 46. Thus, the thrust is transmitted to a central location of the drive housing 46, which is remote from the front wall 98 and rear wall 100. As described above, known drive systems according to FIG. 1 transmit thrust to locations generally adjacent to the front and rear walls 24 and 26 of the drive housing 12, which requires reinforcement to prevent deformation. The relocation of thrust transmission to a central location allows for a narrower drive housing 46, because there is no need for reinforcement of the front and rear walls 98 and 100. Furthermore, it will be appreciated by those skilled in the art that the center of the drive housing is typically stronger than the front and rear walls.

As illustrated in FIGS. 3, 5, and 6, there is preferably no separation between adjacent components of the worm drive assembly 72. The stack-up of tolerances of the components in prior art devices according to FIG. 1 allows for axial movement of the drive gear 18 along the direction of shaft 20, which allows the housing to rotate around vertical rod and axis gear 16 undesirably when the mirror is subjected to road and vehicle induced vibration/excitation. It will be appreciated that providing a worm drive assembly 72 with no separation between adjacent components prevents play by translationally fixing the second shaft 70 and related components to the stationary shaft retainer 88. Fixing the worm drive assembly 72 in this manner ensures that the drive gear 74 remains in engagement with an axis gear 102, which is the key to eliminating play and backlash.

The final component of the drive system 44, the axis gear 102, is coaxial with the axis A and, in the illustrated embodiment, with the vertical rod 52. See FIGS. 2 and 3. The illustrated axis gear 102 takes the form of a worm gear, but it can take any form suitable for engagement with the drive gear 74. The axis gear 102 is stationary with respect to the axis A when acted upon by the torque applied by the motor 54 through the drive gear 74. Thus, operation of the motor 54 will act through the described gear system to rotate the drive gear 74, which will travel around the axis gear 102. The drive housing 46 moves with the drive gear 74 about the axis A in order to rotate the associated assembly or external vehicle mirror housing about the axis A.

In a preferred embodiment and according to conventional design, the axis gear 102 is normally stationary with respect to the axis A, but may be forced to rotate by an outside source. For example, FIG. 2 shows a coil spring 104 and a drive disk 103 associated with the axis gear 102. The drive disk is rotationally fixed to the shaft but allowed to move axially along the shaft. The drive disk 103 is pushed against the axis gear 102 by the coil spring 104. As a result there is friction between the drive disk 103 and the axis gear 102. This friction keeps the drive gear rotationally constrained to the vertical rod up to a particular design torque limit. When a greater torque is applied to the drive housing 44, such as by an operator manually adjusting the assembly, then the friction resistance is overcome and the axis gear 102 will rotate about the axis A, along with the associated assembly. Improvements to the described forced rotation system and alternative forced rotation systems are known to those skilled in the art and may be implemented without departing from the scope of the present invention.

It will be understood that the embodiments of the present invention which have been described are illustrative of some of the applications of the principles of the present invention. Numerous modifications may be made by those skilled in the art without departing from the true spirit and scope of the invention, including those combinations of features that are individually disclosed or claimed herein. For example, the described gear system may be modified to support a motor at an angle, typically perpendicular, to the axis or to reduce the number of parts by more directly coupling the motor to the second shaft. For these reasons, the scope of the invention is not limited to the above description but is as set forth in the following claims.

I claim:

1. A drive system for rotating an assembly about an axis, comprising:
   a drive housing;
   an electric motor associated with the drive housing;
   a first journal bearing mounted within the drive housing;
   a second journal bearing mounted within the drive housing and aligned with the first journal bearing;
   a shaft retainer mounted within the drive housing intermediate the first journal bearing and the second journal bearing, wherein the shaft retainer is substantially stationary with respect to the drive housing, and wherein the shaft retainer includes an aperture aligned with the first journal bearing and the second journal bearing;
   a shaft extending from the first journal bearing to the second journal bearing and through the aperture, wherein the shaft is operatively coupled to the electric motor and mounted for rotation within the drive housing;
   at least one thrust bearing axially fixed to the shaft at a location where it is engaged with the shaft retainer such that thrust loads on the shaft are transmitted to the shaft retainer;
   a drive gear mounted on the shaft for rotation therewith, the drive gear, said at least one thrust bearing and shaft being axially fixed with respect to the shaft retainer such that there is no separation between the drive gear, said at least one thrust bearing and shaft retainer; and
   an axis gear engaging the drive gear and mounted coaxially with the axis.

2. The drive system of claim 1 wherein the assembly is an external vehicle mirror housing.

3. The drive system of claim 1 wherein the shaft is substantially axially stationary with respect to the shaft retainer.

4. The drive system of claim 1 wherein the shaft retainer is a plate.

5. The drive system of claim 4 wherein the drive housing comprises an upper enclosure and a bottom floor, and wherein the plate is retained by the upper enclosure and the bottom floor.

6. A drive system for rotating an assembly about an axis, comprising:
   a drive housing;
   an electric motor associated with the drive housing;
   a motor shaft extending into the drive housing and rotatably driven by the electric motor;
   a motor pinion mounted on the motor shaft for rotation therewith;
   a first shaft mounted for rotation in the drive housing;
   a spur gear mounted on the first shaft for rotation therewith, wherein the spur gear engages the motor pinion;
   a worm mounted on the first shaft for rotation therewith;
   a second shaft mounted for rotation in the drive housing;
   a worm gear mounted on the second shaft for rotation therewith, wherein the worm gear engages the worm;
   a drive gear mounted on the second shaft for rotation therewith;
   a shaft retainer associated with the second shaft between the worm gear and the drive gear, wherein the shaft retainer is substantially stationary with respect to the drive housing;
   at least one thrust bearing axially fixed to the shaft at a location where it is engaged with the shaft retainer such that thrust loads on the second shaft are transmitted to the shaft retainer, the drive gear, thrust bearing, worm gear and second shaft being axially fixed with respect to the shaft retainer such that there is no separation between the drive gear, thrust bearing, shaft retainer and worm gear; and
   an axis gear engaging the drive gear and mounted coaxially with the axis.

7. The drive system of claim 6 wherein the assembly is an external vehicle mirror housing.

8. The drive system of claim 6 wherein the shaft retainer is a plate.

9. The drive system of claim 8 wherein the drive housing comprises an upper enclosure and a bottom floor, and wherein the plate is retained by the upper enclosure and the bottom floor.

10. A drive system for rotating an assembly about an axis, comprising:
    a drive housing including a shaft retainer;
    an electric motor associated with the drive housing;
    a shaft having a first end and a second end, the first and second ends being within the drive housing and supported by first and second bearings, wherein the shaft is operatively coupled to the electric motor and mounted for rotation within the drive housing;
    at least one thrust transfer member axially fixed to the shaft between the first and second bearings and at a location where the thrust transfer member is engaged with the shaft retainer such that thrust loads on the shaft are transmitted to the shaft retainer and the first and second ends of the shaft remain spaced from the drive housing and wherein the thrust transfer member comprises a first thrust bearing and further comprising a second thrust bearing mounted on the shaft with the shaft retainer intermediate the first and second thrust bearings;
    a drive gear mounted on the shaft for rotation therewith, the drive gear, thrust transfer member and shaft being axially fixed with respect to the shaft retainer such that there is no separation between the drive gear, thrust transfer member and shaft retainer; and
    an axis gear engaging the drive gear and mounted coaxially with the axis.

11. The drive system of claim 10 wherein the drive housing comprises an upper enclosure and a lower floor, each having a recess formed therein, and the shaft retainer comprises a plate received in the recesses of the upper enclosure and lower floor.

\* \* \* \* \*